United States Patent [19]

Bowers et al.

[11] 3,969,615

[45] July 13, 1976

[54] INTERPOLATOR FOR NUMERICALLY CONTROLLED MACHINE TOOLS

[75] Inventors: Gary L. Bowers, Clinton; Clyde M. Davenport, Oak Ridge; Albert E. Stephens, Knoxville, all of Tenn.

[73] Assignee: The United States of America as represented by the United States Energy Research and Development Administration, Washington, D.C.

[22] Filed: Dec. 20, 1974

[21] Appl. No.: 534,937

[52] U.S. Cl............................ 235/151.11; 318/573; 318/574
[51] Int. Cl.².................... G06F 15/46; B23Q 11/18
[58] Field of Search............................. 235/151.11; 318/573–574

[56] References Cited
UNITED STATES PATENTS

| | | | |
|---|---|---|---|
| 3,254,203 | 5/1966 | Kveim.......................... | 235/151.11 X |
| 3,763,363 | 10/1973 | Saita et al.................. | 235/151.11 X |
| 3,860,805 | 1/1975 | Strukel....................... | 235/151.11 X |

*Primary Examiner*—R. Stephen Dildine, Jr.
*Attorney, Agent, or Firm*—Dean E. Carlson; David S. Zachry; David E. Breeden

[57] ABSTRACT

A digital differential analyzer circuit is provided that depending on the embodiment chosen can carry out linear, parabolic, circular or cubic interpolation. In the embodiment for parabolic interpolations, the circuit provides pulse trains for the X and Y slide motors of a two-axis machine to effect tool motion along a parabolic path. The pulse trains are generated by the circuit in such a way that parabolic tool motion is obtained from information contained in only one block of binary input data. A part contour may be approximated by one or more parabolic arcs. Acceleration and initial velocity values from a data block are set in fixed bit size registers for each axis separately but simultaneously and the values are integrated to obtain the movement along the respective axis as a function of time. Integration is performed by continual addition at a specified rate of an integrand value stored in one register to the remainder temporarily stored in another identical size register. Overflows from the addition process are indicative of the integral. The overflow output pulses from the second integration may be applied to motors which position the respective machine slides according to a parabolic motion in time to produce a parabolic machine tool motion in space. An additional register for each axis is provided in the circuit to allow "floating" of the radix points of the integrand registers and the velocity increment to improve position accuracy and to reduce errors encountered when the acceleration integrand magnitudes are small when compared to the velocity integrands. A divider circuit is provided in the output of the circuit to smooth the output pulse spacing and prevent motor stall, because the overflow pulses produced in the binary addition process are spaced unevenly in time. The divider has the effect of passing only every nth motor drive pulse, with *n* being specifiable. The circuit inputs (integrands, rates, etc.) are scaled to give exactly *n* times the desired number of pulses out, in order to compensate for the divider.

6 Claims, 12 Drawing Figures

INTERPOLATOR FOR NUMERICALLY CONTROLLED MACHINE TOOLS

BACKGROUND OF THE INVENTION

This invention was made during the course of, or under, a contract with the U.S. Atomic Energy Commission.

This invention relates generally to numerical controllers for automatic machining and more specifically to improvements in interpolator circuits of the digital differential analyzer type for use in numerical controllers to generate drive motor pulses to produce precisely defined, non-linear machine tool motion from a single data block of part description data.

In the art of numerical controlled automatic machining digital differential analyzers (DDA) are used to perform mathematic functions from part description data blocks to generate motor drive pulses which position the machine slides. One block of data, which may be read from punched tape or other conventional storage means, essentially specifies the end points for a given tool motion. The data block is read into a buffer storage register in the conventional numerical controller and the controller generates command pulses which are fed to the machine slide drive motors. The output circuits of a numerical controller (NC) are generally special DDA circuits (one for each axis of movement) which accept data in the form of a binary number which specifies the tool motion end points. The DDA is said to interpolate between the end points for a data block. Most NC machines are capable of only straight-line tool motion or linear interpolation; some provide coarse non-linear interpolation capability.

If only linear interpolation is available, all contours to be cut must be approximated by straight-line segments. The segments may be made short enough so that any reasonable approximation may be obtained. The typical allowed deviation from the true contour is one-half the machine pulse resolution. Each straight-line segment is represented by one block of data on the input tape. A difficulty arises from the latter fact. Very close tolerances can result in very long data tapes—so long that tape reader errors become highly probable. Error rates of one error per million bit transferred are typical for tape readers. Since the standard BCD tape format has 80 bits per inch, the error rate works out to about one error per 1000 feet of tape. The result is that, if a part requires a tape of about 1000 feet or more in length, the risk of machining failure is high.

Tape length for machining large or complicated parts to close tolerance or machining parts which require many specialized operations have steadily increased over the years until lengths of 1000 feet of more are not unusual. Machining failures have occurred because of tape reader errors, and ways have been sought to eliminate the problem. One technique which, aside from its other advantages, will solve the problem is direct digital numerical control (DDNC). Local core memory at the machine tool is loaded with the entire file of part description data from a remote computer via data transfer lines. The stored information may be checked for errors before machining begins. The data are then read from the core as machining proceeds. There is still a problem in the core memory approach, however. The increasingly large volumes of data require large blocks of core memory, which are expensive. The core presently costs about $1,800 per 8K module, and up to 8 modules may be required in extreme cases for a total core memory cost of about $14,400. Thus, there is a need for some way to reduce the volume of data required by the controller.

REFERENCES

U.S. Pat. No. 3,825,735, issued July 23, 1974, to Gary L. Bowers et al. for "Command Pulse Generator For Computer-Controlled Machining," and having a common assignee with the present invention.

SUMMARY OF THE INVENTION

In view of the above need it is an object of this invention to provide a digital differential analyzer (DDA) circuit for use in a numerical controller for automatic machining which requires less part description data for close tolerance machining of contoured parts.

Another object of this invention is to provide a DDA according to the above object which accepts part description data in direct binary form, one block at a time, and produces trains of pulses which are applied to the machine axes drive motors to direct a machine tool along a non-linear path.

Yet another object of this invention is to provide a DDA which accepts part description data defining acceleration and initial velocity values for each axis of movement and generates separate trains of pulses to control positioning through each axis drive motor according to the second digital integration of the acceleration value stored in binary form.

Other objects and many of the attendant advantages of the present invention will be obvious to those skilled in the art from the following detailed description taken in conjunction with the drawings.

BRIEF DESCRIPTION OF THE DRAWINGS

FIG. 4, which includes

DETAILED DESCRIPTION

Figure 1:
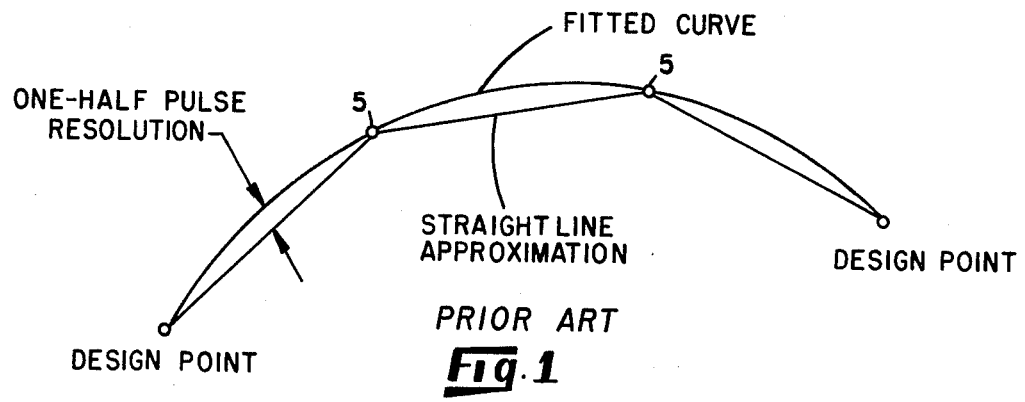
FIG. 1 is a schematic representation of a desired part surface segment to be machined by means of approximating the contour with straight-line segments.

Referring now to FIG. 1, a discussion of the prior art will be presented to more clearly show the problems involved in automatic machining of contoured parts requiring close tolerances. A typical situation is illustrated in FIG. 1, where a part surface is described by a set of straight-line segments along the surface contours. To obtain the part description data, the part surface is described by a set of discrete points along the contour, typically spaced 2° apart. These part description points are fed into a computer which is programmed to fit some smooth mathematical curve through the data points and then locate point 5 between the design points such that straight-line motion between the points will not deviate by more than one-half the machine positioning pulse resolution, typically, from the fitted curve. Each straight-line segment creates a block of data for the part description tape. For small pulse resolutions, the number of data blocks required becomes very large. For example, the curved surface of a ten-inch-radius hemishell requires about 4500 straight-line segments if the approximation is to be good to within 0.15 microinch.

Once the tape has been prepared for machining a given part on a two-axis lathe, for example, it is loaded into the machine tape reader which feeds the part description data for each axis control, one block at a time, into a numerical controller. The controller then interpolates between the end points of each data block, one data block at a time, to generate pulses at the proper to move the cutting tool relative to the workpiece according to the sum of the component movements in the different axes. The rate of command pulses applied to the different axes drive motors determines the tool feed-rate as the tool moves in a linear path between the end points defined by a data block.

The present invention deals with the generation of command pulses to coordinate axes drive motors to control the movement of a machine tool, for example, along a non-linear path. The invention will be described by way of example, illustrating in detail a system for parabolic interpolation which improves positioning accuracy along a contoured path while reducing the number of data blocks by an order of at least 10 to 1 over the above-described linear interpolation method to machine the same 10-inch radius hemishell. A substantial reduction in cost of core memory may be realized by this system, as described above, in which the part description is stored in a magnetic core memory rather than punched tape.

Figure 2:
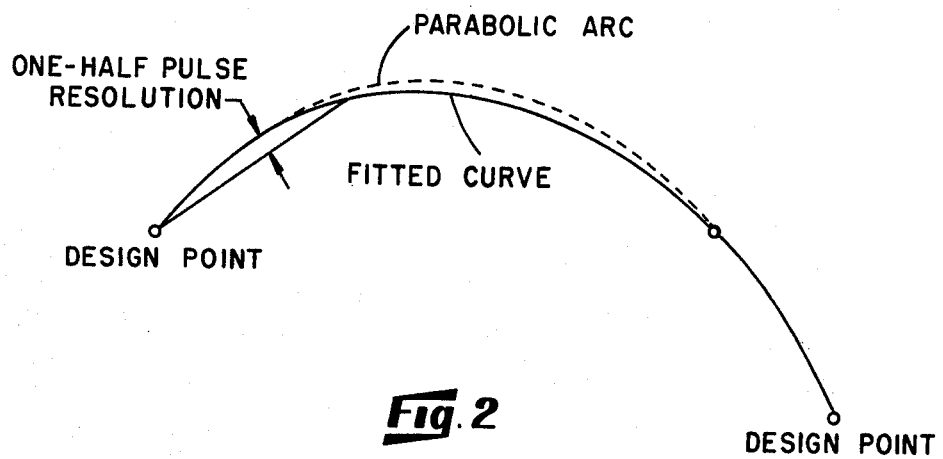
FIG. 2 is a schematic representation of a desired part surface segment to be machined by means of approximating the contour with parabolic arc segments.

Tool motion along a parabolic path is called parabolic interpolation. The part contour is approximated by a series of parabolic arcs. As shown in FIG. 2, one parabolic arc covers a much greater length of the part contour than a straight-line segment. Thus, by approximating a part contour by a series of parabolic arcs, the part has a better surface finish because the path of the tool tip is tangent to the surface contour at either end of a data block. The tool path is continuous in both position and slope.

Figure 3:
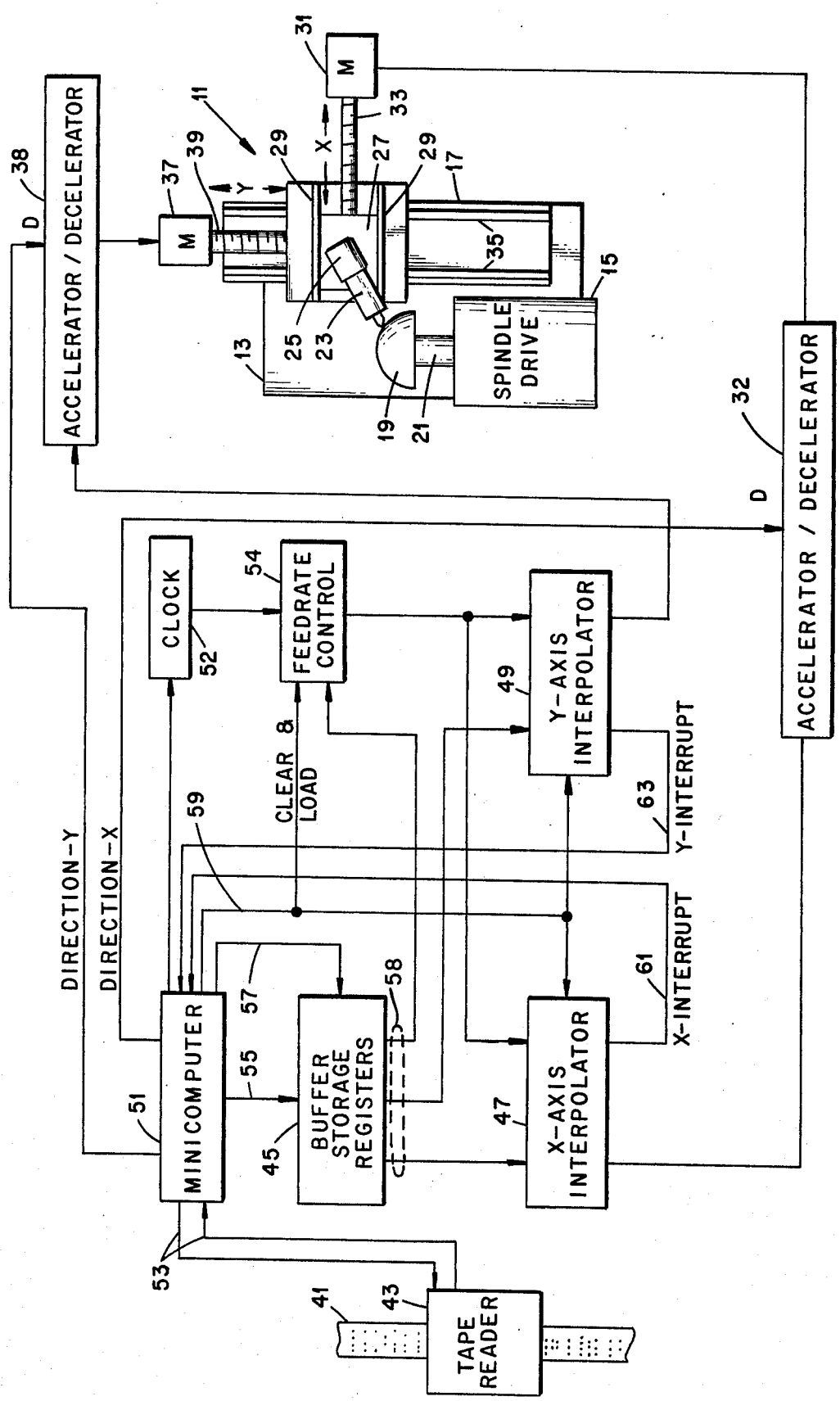
FIG. 3 is a simplified block diagram of the control system of the present invention.

Referring now to FIG. 3, there is shown a block diagram of a control system according to the present invention for performing non-linear interpolation to position a two-axis lathe cutting tool along a parabolic path. The lathe, generally designated at 11, has a table 13 adapted to support a spindle drive 15 and a carriage support assembly 17. The spindle drive 15 is disposed to rotatably support a workpiece 19 by means of a spindle 21. The spindle 21 is driven in a conventional manner at a desired rotational speed. A cutting tool 23 is carried by a tool holder 25 mounted on a slide 27 which may be positioned along the X axis of the machine in an X-axis slideway 29 by means of an X-axis drive motor 31 acting through a screw drive 33. The X-axis slideway is disposed for positioning along the Y axis of the machine in a Y-axis slideway 35 by means of a Y-axis drive motor 37 acting through a screw drive 39.

The drive motors 31 and 37 may be conventional pulse motors which accept drive pulses to move the corresponding slide a fixed distance for each pulse, typically, 20 microinches/pulse. The motors 31 and 37 are provided with corresponding accelerator/decelerator input circuits 32 and 38 which control the pulses applied to the motor and the direction of rotation of the motor through separate control lines connected to the direction control inputs (D) of the circuits 32 and 38. The purpose of the accelerator/decelerator circuits 32 and 38 is to prevent the loss of pulses between extreme velocity transitions which is a well known technique in the use of pulse motors for positioning systems.

The part description data on a punched tape 41, which may be direct binary or binary coded decimal (BCD) is read by a tape reader 43. The data output of tape reader 43 is connected to the data input of a minicomputer 51. The computer core memory is of a size sufficient for storage of a complete part description tape, both the X and Y axis data along with control and feedrate values for each block. The computer controls the transfer of data one block at a time as the part is machined into a series of buffer registers where the block is temporarily stored for parallel transfer under computer control. The buffer outputs, one set for the X-axis and one for the Y-axis, are connected, respectively, to the X-axis interpolator 47 and Y-axis interpolator 49. The interpolators are identical and form the heart of this invention. The output of the X-axis interpolator is connected to the X-axis drive motor accelerator/decelerator circuit 32 and the output of the Y-axis interpolator is connected to the Y-axis drive motor accelerator/decelerator circuit 38. The command pulses generated by the interpolators 47 and 49 are fed to the motors to move the cutting tool 23 along a non-linear path relative to the workpiece as will be described hereinbelow.

The transfer of data from the tape reader into the computer 51 is performed under computer control via control lines 53 which step the tape reader to serially load all the part description data into the computer core memory. The computer may be programmed to translate the data from the standard BCD tape format to direct binary format before core storage, since the system here described is based on direct binary format for direct digital numerical control (DDNC) as opposed to the BCD format of most conventional numerical controllers for automatic machines.

The computer 51 is programmed to clear and load the various registers of the interpolation system which operates in an open-loop control mode to generate command pulses to the drive motors 31 and 37. A data block is transferred to the buffer storage registers 45 through a data output line 55. Conventional control lines 57 are provided from computer 51 to the registers 45 to clear and load the data values into the registers. Both the X and Y axis data values and feedrate values are loaded in the appropriate buffer storage registers for simultaneous parallel transfer into the function registers of the interpolators 47 and 49 and a feedrate controller 54.

Conventional control lines 59 from computer 51 are provided to the interpolators (47 and 49) and the feedrate controller 54 so that they are cleared at the beginning of each data block and loaded from the buffer registers via data input lines 58 connected, respectively between the appropriate buffer registers 45 and the interpolators and feedrate controller 54. The feedrate controller 54 is operated by means of an input from a system clock 52.

At the end of the interpolation of each data block an interrupt signal is generated at an output of both the X and Y axis interpolators and fed to the computer 51 via lines 61 and 63, respectively. When both interrupts are detected the computer clears the buffer storage registers 45 and the next data block is fed into the registers for the next interpolation.

To complete the overall view of the system before a detailed description of the interpolators 47 and 49 and associated control, it should be understood that the data values operated upon by the interpolators are absolute values and the sign, or direction, of velocity does not change within the interpolation of a single data block. The data blocks for each portion of a surface contour are selected so that the velocity will never pass through zero inside a data block. Therefore, the direction of motor rotation may be selected for an entire block prior to the block interpolation. Thus, the computer has a direction control output for each axis drive. In this case, X and Y axis direction control lines are provided from the computer 51 to the direction (D) inputs of the drive motor acceleration/deceleration circuits 32 and 38, respectively, to set the corresponding motor direction for the execution of one data block interpolation. This is a conventional mode of operation for most numerical controllers for automatic machining. Additional circuitry (not shown) may be added to the system to compensate for the error due to hysteresis and slack in the mechanical drive train. Such circuitry forms no part of the invention described here and thus need not be explained to obtain a complete comprehension of the present invention. Hence, one block of interpolation data is always chosen to end at a slide reversal point, if such tool motion is required and the slack is removed before continuing with the next block.

Figure 4A:
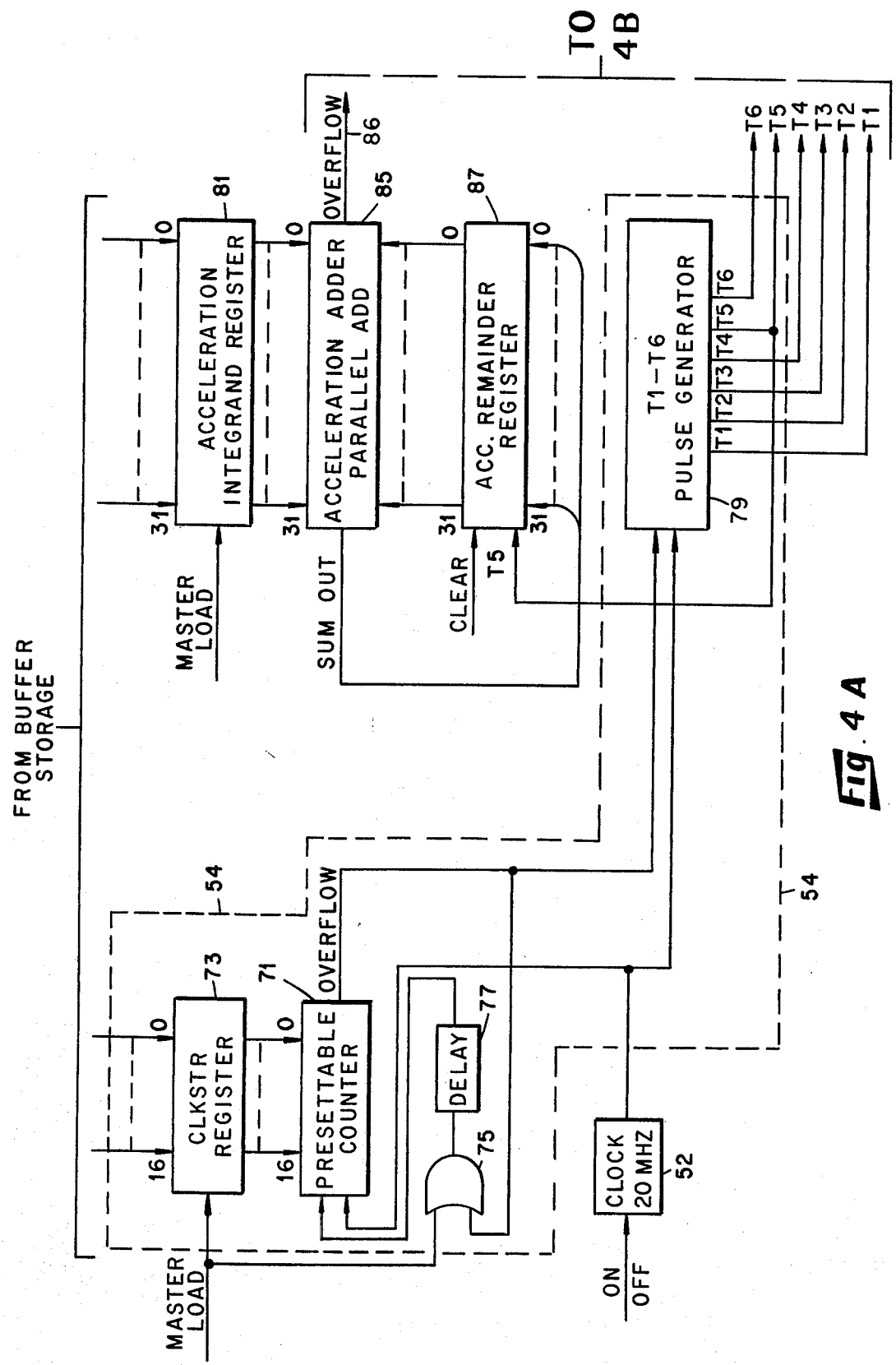
FIGS. 4A–4C, is a schematic block diagram of one of the identical interpolators shown in block form in FIG. 3 for performing parabolic interpolation.
Figure 4B:
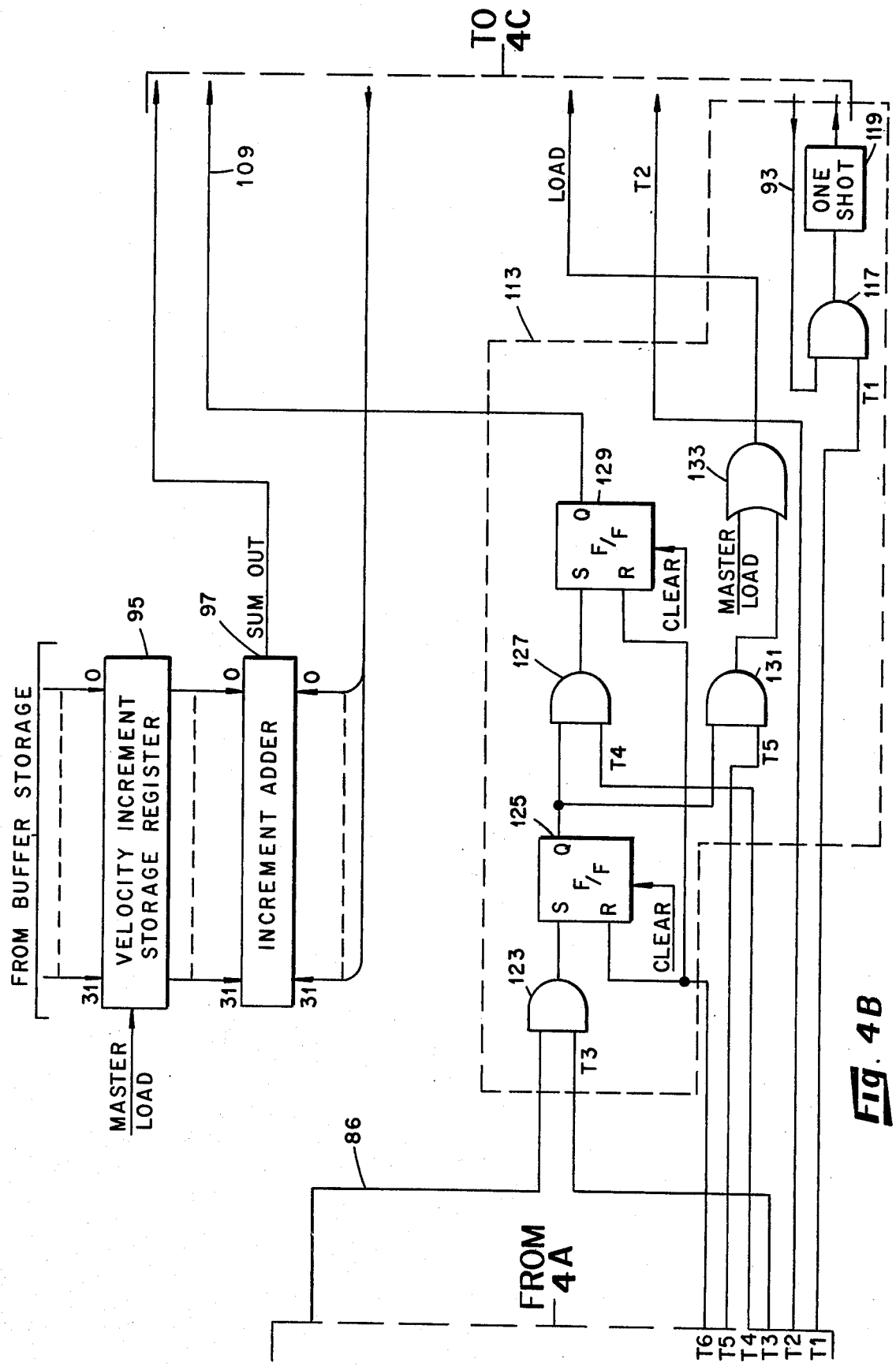
Figure 4C:
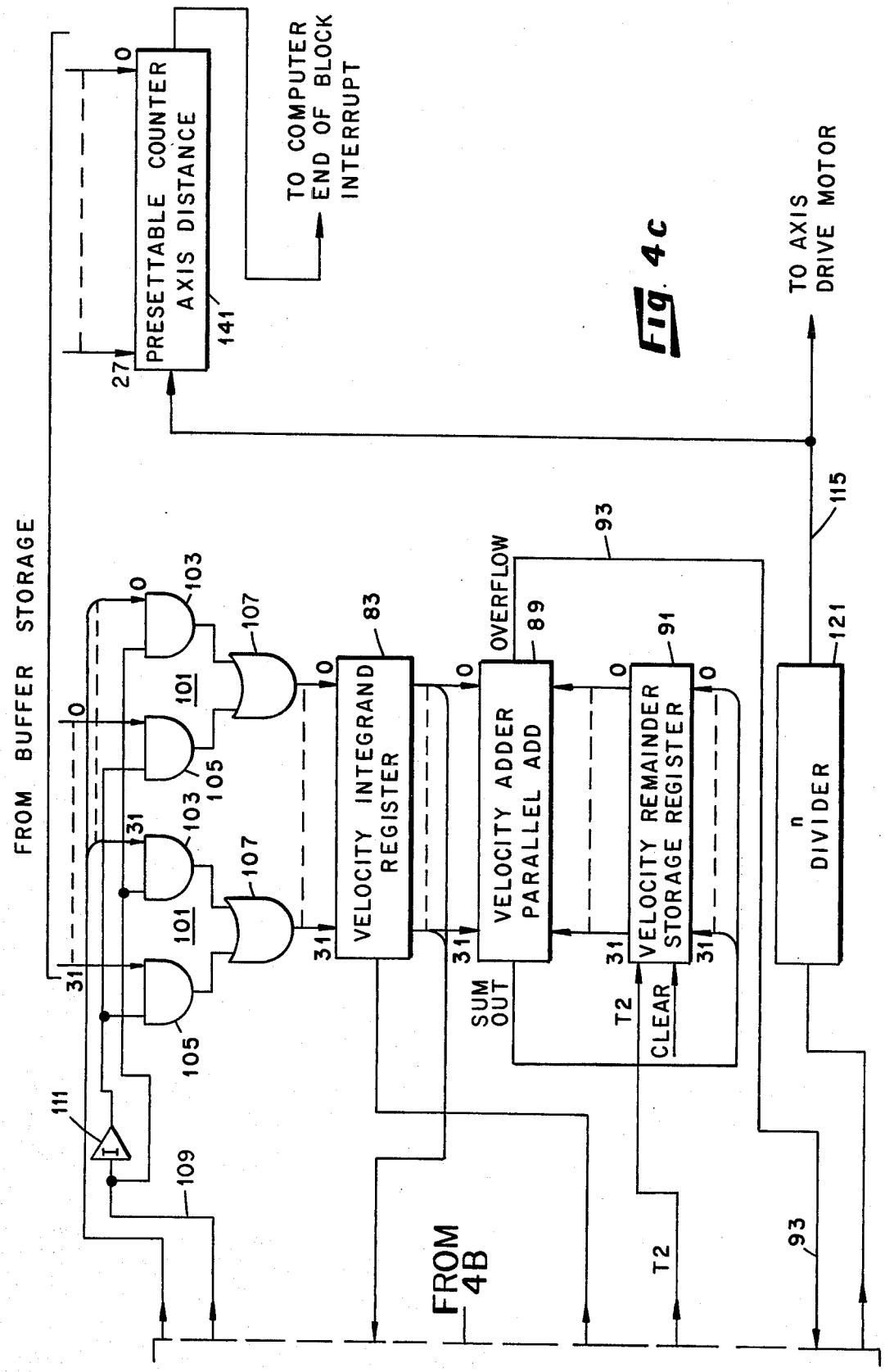

Referring now to FIG. 4, composed of FIGS. 4A-4C, there is shown a detailed block diagram of the interpolator for one axis. Although the clock 52 and feedrate controller 54 are shown with the single axis interpolator drawing, it will be understood that these components control the feedrate for both the X and Y axis interpolators. However, the function will be clearly understood from the following detailed description of the feedrate controller with one of the interpolators, since the interpolators for each axis are identical.

First, with regard to the feedrate controller 54, the clock 52 output is connected to the count input of a presettable counter 71 which is repeatedly preset to the same number throughout an interpolation of a block of data each time the counter is counted to an overflow condition. A clock store (CLKSTR) value which controls the feedrate for the block is loaded from one of the buffer storage registers into a 16-bit CLKSTR register 73 when the master load line from computer 51 is activated. The CLKSTR value is subsequently loaded into the presettable counter 71 by applying the master load signal line to one input of an OR gate 75 having its output connected to a delay circuit 77. The output of the delay circuit is connected to the load input of counter 71. The delayed load signal presets the counter by transferring the CLKSTR number into the counter 71 from the register 73. The counter is then repeatedly reset each time an overflow occurs by applying the overflow output to a second input of gate 75. Thus, it will be understood that the rate at which the counter 71 overflows may be varied from block-to-block by selecting the proper CLKSTR number.

Each overflow from the counter 71 generates a sequence of control pulses T1–T6 which follows the clock 52 rate. The pulses T1–T6 may be generated by simply connecting a 6-bit shift register 79 to allow the overflow pulse to set a one in the first bit position corresponding to a one at T1, and shift the one through the register by means of the clock output connected to the shift input of register 79. The manner in which the T1–T6 pulses control the application of the command pulses to the drive motors will be described as the description of the interpolator continues.

As will be seen from FIG. 4, the interpolator accepts an acceleration value and initial velocity value, each in binary form for an interpolation of a data block. Upon receiving the master load signal from computer 51 of FIG. 3, the data values for acceleration and velocity are transferred simultaneously from the appropriate buffer storage registers 54, FIG. 3, to an acceleration storage or integrand register 81 and a "velocity" storage or integrand register 83. The acceleration integrand register 81 is a 32-bit register (0–31) which has each bit position connected to one set of add inputs of a 32-bit parallel adder 85. The sum output of adder 85 (32 output lines) is connected to the corresponding bit positions of an identical bit size (32 bits) remainder storage register 87. The sum of the first and second inputs to adder 85 is continuously available at its sum output. The bits of register 87 are connected in parallel to the second set of add inputs of adder 85, so that when an add command signal (load signal) is applied to register 87, the adder 85 sum output is loaded into register 87. Since the loaded sum is the remainder of the previous addition, it is applied to the second set of inputs to adder 85 to generate a new sum which is the integrand register 1 value added to the new remainder. The new sum output of adder 85 is not loaded into the remainder register 87 until the next add command applies a load pulse to the remainder register 87. Therefore, it will be seen that the integrand value and the remainder value are continually applied to the adder 85, and when an add command is applied to reload register 87 with the previous adder sum, the remainder register value is automatically added to the acceleration value of register 81. The new sum is held in adder 85 until the next add command. Since the adder 85 is of a fixed bit size equal to the registers 81 and 87 bit size, it will eventually overflow as the acceleration value is continually added to itself. This activates the overflow line 86. As will be explained hereinbelow, the overflow pulses are indicative of the integral of the acceleration number stored in register 81 with respect to the add rate as controlled by the CLKSTR value. This circuit is known in the art as a digital differential analyzer (DDA) for obtaining the integral of a binary number with respect to time.

Registers and parallel adders which will perform in the above-described manner may be constructed from commercially available chips, and thus further discussion of the operation need not be included here for a complete understanding of the invention. For example, the integrand registers are integrated circuits identified by Model No. SN74298, the parallel adders are composed of 8 integrated circuit chips (4 bits each for 32-bit addition) identified by Model No. SN74181, and the remainder registers and the velocity increment storage register are integrated circuits identified by Model No. SN74199. All of the above integrated circuits are supplied by Texas Instruments, Dallas, Tex.

Similarly, velocity integrand register 83 is connected to one set of inputs of another parallel adder 89. The velocity adder 89 has a sum output which is parallel fed to corresponding bit inputs of a velocity remainder storage register 91. The outputs of register 91 are connected to a second set of inputs of velocity adder 89. Overflows of the velocity adder (32 output line) appear on the adder output line 93. The overflows from the velocity adder provide the drive motor pulses as will be explained below.

An additional 32-bit register 95, the velocity increment register, is provided into which a "one" is set in a particular bit position corresponding to the bit position the velocity integrand register is to be incremented, as will be explained hereinbelow. The outputs of the register 95 are connected to one set of inputs of another parallel adder 97 of identical bit size. The second set of inputs to adder 97 is connected to the corresponding 32 bits of the velocity integrand register 83 so that upon command the value stored in the velocity register 83 is incremented by "one" at a bit position selected by the bit position in which the "one" is set in the increment register 95. The sum output of the increment adder 97 is parallel fed through gating circuits 101, one gating circuit for each of the 32 bits, back to the velocity integrand register 83.

Each of the 32 gating circuits 101 (only two of which are shown) consists of a pair of AND gates 103 and 105 whose outputs are connected to separate inputs of corresponding bit position OR gates 107. The outputs of OR gates 107 are connected to the corresponding bit position inputs of the velocity integrand register 83. Therefore, the sum outputs of the adder 97 are connected to respective bit position inputs of AND gates 103 while the second inputs of AND gates 103 are connected in common to a control line 109. The AND gates 105 are connected to receive, at one input, the respective bits from the appropriate buffer storage register to initially transfer the initial velocity value to register 83 under direction of the master load control signal from computer 51. Gates 105 are enabled at this time by means of connecting the second inputs in common to the output of an inverter 111. Since control line 109 is low at this time, the output of inverter 111 will be high so that AND gates 105 are enabled and AND gates 103 are disabled.

Referring now to the sequence generator indicated by the circuit portion enclosed by dotted line 113, it will be seen how the T1–T6 pulses from pulse generator 79 control the interpolator sequence of events to produce the motor drive pulses at output line 115. The T1 output of pulse generator 79 is connected to one input of an AND gate 117 which has its second input connected to the velocity adder 89 via overflow line 93. The output of AND gate 117 is connected to a fixed period one-shot 119 which generates a fixed period command pulse each time a trigger pulse is applied through gate 117, indicative of an overflow from the velocity adder 89 along with the T1 pulse. The output of one-shot 119 is connected to the input of a divider circuit 121 whose output provides the motor drive pulses for the particular axis from the corresponding axis interpolator as shown in FIG. 3. The purpose of the divider circuit 121 is to smooth out the motor drive pulses to prevent motor stalling, as will be explained hereinbelow.

The T2 output of pulse generator 79 is connected to the load command input of the velocity remainder storage register 91, which may be termed the add command signal for the velocity DDA circuit. At the time of pulse T2 the sum value held in adder 89 is loaded into the remainder storage register 91 and added to the integral value stored in the velocity integrand storage register 83 to generate a new sum, as described above with reference to the description of the acceleration value addition, or integration, process. It will be understood that on the application of the first T2 pulse, following the loading of the initial velocity value into the velocity register 83, the addition step simply transfers the initial velocity value into the velocity remainder register 91, since the velocity remainder register 91 has been cleared to set all bits to zero by a clear signal applied to the clear input from computer 51 just prior to the master load signal.

Each T3 pulse interrogates the overflow line 86 (FIG. 4A) to see if an acceleration overflow occurred on the previous addition. This is done by connecting the T3 pulse output from pulse generator 79 to one input of an AND gate 123 while connecting the other input of gate 123 to the acceleration adder overflow line 86. If an overflow is present on line 86, both inputs to gate 123 will be high and thus the output of gate 123 will be high. The output of gate 123 is connected to the set (S) input of a flip-flop 125 which has its reset (R) input connected to the T6 output of pulse generator 79. Flip-flop 125 also has a direct reset input connected to the computer clear line to insure that flip-flop 125 is initially in the reset state. The set output (Q) of flip-flop 125 is connected to one input of an AND gate 127 which has its second input connected to the T4 output of pulse generator 79. The output of AND gate 127 is connected to the set input of another flip-flop 129 which has its reset input connected to the T6 output of pulse generator 79 and the direct reset input connected to the computer clear output line to function in the same manner as flip-flop 125. The set output (Q) of flip-flop 129 provides the control signal for control line 109 connected to the input of inverter 111.

The Q output of flip-flop 125 is also connected to one input of an AND gate 131 which has its second input connected to the T5 pulse output of pulse generator 79. The output of AND gate 131 is connected to one input of an OR gate 133 which has its second input connected to receive the master load signal from computer 51. The output of OR gate 133 is connected to the load input of the velocity integrand register 83. Thus, register 83 may be loaded from the appropriate buffer storage register 45, FIG. 3, by applying the master load signal or reloaded with the offset adder 97 sum, which has incremented the velocity value of register 83 each time there is an overflow from the acceleration adder 85.

The T5 output of the pulse generator 79 is also connected to the load input of the acceleration remainder register 87 so that an addition is performed each time the T5 pulse is present. Recalling that the T1–T6 pulses are generated consecutively at the clock 52 pulse rate each time the feedrate circuit counter overflows, it will be seen that the addition rate in the acceleration DDA circuit and the velocity DDA circuit for a data block is controlled by the CLKSTR number set in register 73. The CLKSTR is a two's complement binary value of the binary number for the prescribed feedrate. The spacing between overflow pulses in the digital integration process depends on the nature of the binary addition, and although the spacing may be irregular (i.e., each addition may not generate an overflow), the correct number of overflows for one data block is always generated in a period of time that satisfies the desired feedrate requirement. Since the total time of travel, T, for a data block depends upon the desired feedrate, F, the rate of additions, $R_i$, or iteration rate, may be specified as follows:

$$R_i = \frac{\text{total iterations}}{\text{total time}}$$

Assuming that the add rate is 1000 KHz, the time/addition is equal to $1/R_i$, which in this case would be 1 microsecond. Since the clock 52 rate is 20 MHz, or 50 nanoseconds per pulse, a CLKSTR number must be loaded into the register 73 of the feedrate controller which will produce an overflow, add command, every 1 microsecond when the counter 71 is pulsed at the 20 MHz clock rate. Thus, the number of counts per add command is equal to the time/addition (1 microsecond) divided by the clock pulse period (50 nanoseconds). Thus, the required number of counts/add command is seen to be 20.

This number then determines the 16-bit CLKSTR number stored in the computer 51 for the particular data block. The number is first converted to binary form (10100), and since the clock store register 73 is a 16-bit register, the number stored in the computer 51 would be (0000000000010100). This number is converted to the 2's complement (1111111111101100) which is the CLKSTR number loaded into register 73. This number is then loaded into the counter 71 and then repeatedly loaded into counter 71 each time the counter is counted to overflow (20 clock pulses) to generate an add command. Thus, the counter 71 is preset to the 2's complement of the time per addition value and counted to overflow, and it will be seen that the rate at which counter 71 overflows is dependent on the magnitude of the CLKSTR number.

Each add command triggers the generation of the six (T1–T6) sequence control pulses which may be timed as desired by dividing the clock rate to the pulse generator to fit within the shortest add command period. The T1 pulse checks to see if there was an overflow at the velocity adder 89 from the previous addition. The T2 pulse triggers the velocity DDA add sequence by applying the T2 pulse to the load input of the velocity remainder storage register 91, as explained above. Each time an overflow is generated when this addition is performed, it holds the output line 93 high until the next addition. The T3 pulse then checks for an overflow condition of the acceleration adder 85 from the previous addition. If an overflow is present, gate 123 is enabled and flip-flop 125 is set. Then the T4 pulse checks for a set condition of flip-flop 125; and, if it is set, gate 127 is enabled and flip-flop 129 is set. The setting of flip-flop 129 enables each of the AND gates 103 of the velocity storage register 83 input gating circuits 101, and the T5 pulse then loads the velocity storage register 83 with the modified velocity value from the velocity increment adder 97. The T5 pulse also triggers the next acceleration DDA addition by triggering the load input of register 87. The T6 pulse then resets the flip-flops 125 and 129 and when the next overflow pulse of the feedrate controller counter 71 occurs, the pulse generator 79 is again triggered to repeat the above-described sequence of events.

To detect the end of the interpolation for a data block, a presettable counter 141 is provided which is connected to an appropriate one of the buffer storage registers 45 which have been loaded with the binary 2's complement of a binary number that will cause the counter 141 to overflow when the correct number of motor drive pulses for the particular axis has been generated for the particular data block. The motor drive pulses are counted by connecting the drive motor pulse line 115 to the count input of counter 141. The overflow output of counter 141 is connected to computer 51 via the corresponding axis interrupt line, as shown in FIG. 3. Thus, when the interpolator has generated the proper number of pulses to the drive motor for positioning the axis slide the known distance for the data block, the counter 141 will overflow and the computer interrupt is generated. The computer then turns the clock 52 "Off" via a control line, as shown in FIG. 3, clears the interpolator registers, and loads the buffer registers 45 with the data values for the next data block. The next data block interpolation begins when the master load signal from computer 51 is applied to load the interpolator registers and the feedrate controller CLKSTR value and the clock 52 is again turned "On."

Having described the parabolic interpolator circuit and its operation, the arithmetic involved in obtaining parabolic path tool motion on a two-axis machine, as shown in FIG. 3 with the interpolator functions as described above, will now be explained in detail. Simplified functional diagrams of portions of the interpolator hardware as shown in FIG. 4, will be used to more clearly show the arithmetic operations within the interpolator. Although the add commands are shown connected to the various adders, it will be understood that the circuit depicts the same function as the detailed description given above; i.e., each time an add command is applied to the digital integrator circuit the integrand value is added to the remainder value. Like reference numerals will be used for ready cross-reference to the hardware diagram of FIG. 4.

Figure 5:
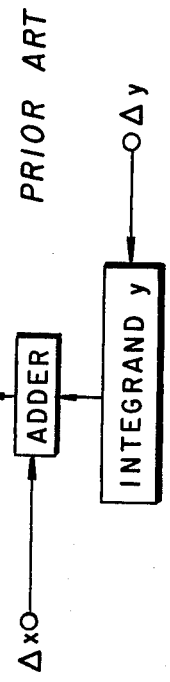
FIG. 5 is a simplified block diagram of the basic prior art digital integrator.

Referring first, however, to FIg. 5, there is shown the basic building block for any DDA circuit, which is a digital integrator. This circuit is sometimes called the digital equivalent of an analog integrator circuit. One pulse which increments the integrand register contents represents one Y increment unit, $\Delta Y$. One add command pulse to the adder represents one X increment unit, $\Delta X$, and causes the addition of the current integrand Y to the remainder register. Continual binary addition to the remainder causes it to overflow its register periodically, assuming both the integrand and remainder registers are of equal bit size, at a rate determined by the rate of $\Delta X$ inputs and by the magnitude of the integrand, Y. Over time, the overflows sum up to the rectangular approximation of the integral of Y over X.

Most interpolators used in numerical machine control for linear interpolation employ the simple DDA circuit in which the integrand register is set at some constant velocity value and the additions are performed at a specified rate which determines the machine feed-rate so that the overflows represent the integral of the constant velocity integrand value or sometimes referred to as the distance value, with respect to time. This results in a linear machine tool motion. A system of this type for a two-axis machine is described in the above-referenced U.S. Pat. No. 3,825,735.

To obtain non-linear tool motion, it is necessary to vary the velocity integrand. In NC machines a simple parabolic interpolation circuit for very rough approximation of parabolic motion may be obtained by essentially connecting two DDA's in series with a constant acceleration value loaded in the first DDA integrand register and apply the overflows from the first DDA to increment the integrand register of the second DDA, which may have an initial velocity value ($V_o$) loaded therein. With identical rate clock pulses applied to the adders of the series connected DDA's simultaneously, the overflows of the second DDA over time will sum up to the second integral of the acceleration value to obtain the tool position along one axis of the machine, for example: the X axis, with respect to time in the form $$X \simeq a_o/2\ t^2 + V_o t + X_o$$

where $a_o$ is the acceleration integrand register value, $V_o$ is the initial velocity integrand register value and $X_o$ is the initial position. The sum of overflows from a circuit of this type is essentially as follows:

$$\Sigma\ [V_o + \Sigma a_o \Delta t]\ \Delta t,$$

where $\Delta t$ represents one time increment.

The simplified interpolator described above has two major sources of inaccuracy. The first is that all integrands are truncated at the radix point, because no provision is made for handling fractional numbers. The effect is to subtract some fraction $\Delta I_{xv}$, $\Delta I_{xa}$, and so on from the integrands, thus causing errors to accumulate as the integration takes place. A general rounding scheme helps only slightly. The second source of error occurs when the acceleration integrand magnitudes are small when compared to velocity integrand values. The rates of overflow from the acceleration integrator will be very low, causing a very "coarse" discrete approximation of the integrated acceleration as a function of time. The final integration thus produces inaccurate position as a function of time. Again, conventional scaling schemes provide some improvement, but not enough for very high precision work.

A second source of difficulty arises because some pulse motor drives require a very "smooth" input pulse spacing. An abrupt, even if temporary, change in pulse spacing will cause the drive motor to stall. It is a fact of the binary addition process that the overflows from a digital integrator will be spaced unevenly in time. For example, overflows might occur on the third, sixth, eighth, and eleventh iterations, giving a time spacing of three, three, two, and three time units. Pulse spacing must increase or decrease in order to get feedrate variation, but it should not fluctuate locally any more than a few percent about the general trend.

Figure 6:
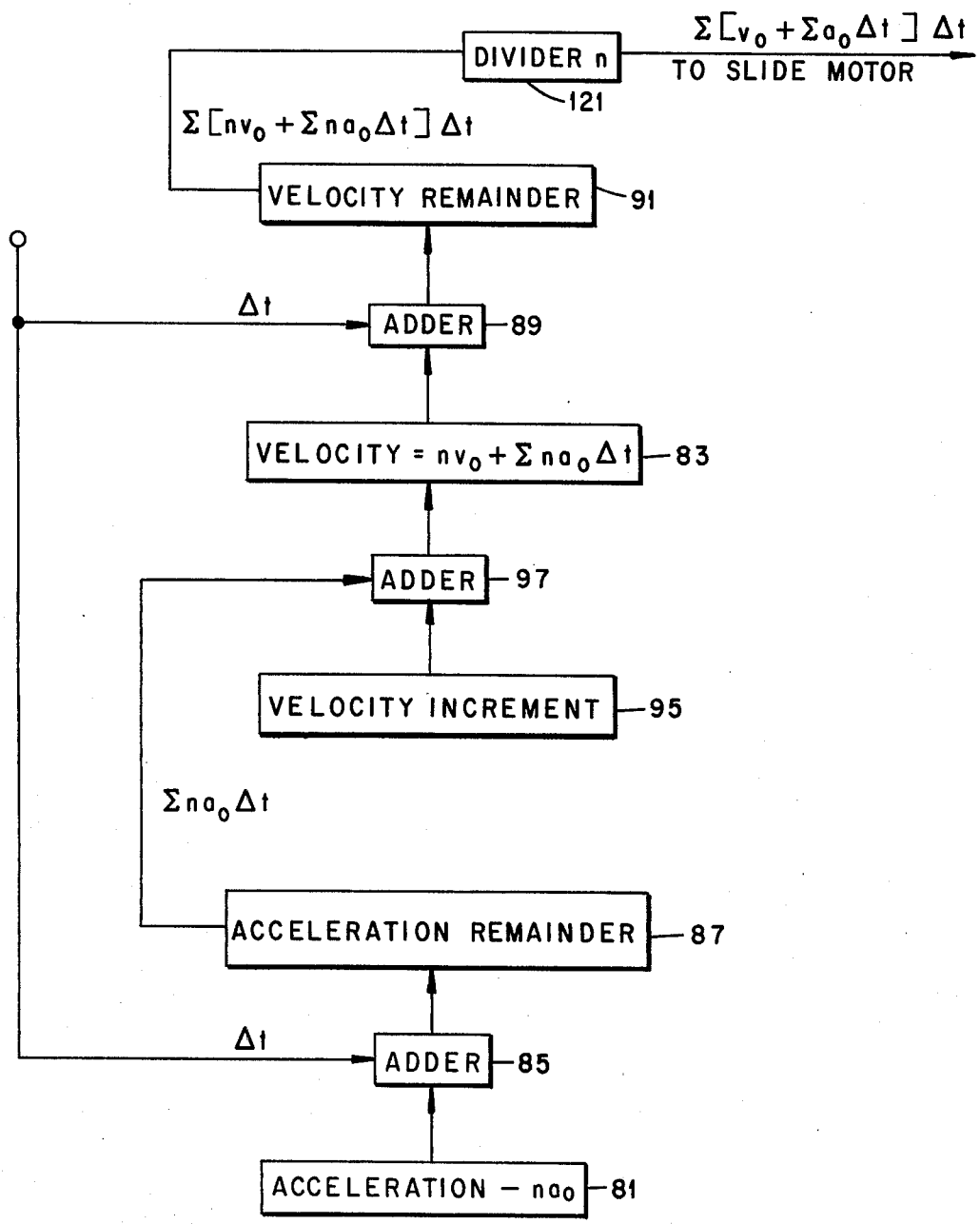
FIG. 6 is a simplified block diagram of the interpolator of FIG. 4 which readily depicts the mathematics performed by the parabolic interpolator.

This ultraprecise interpolator function is based on the same general mathematics as the simple model described previously. However, two key modifications are made in the hardware; the addition of the velocity increment storage register 95 and adder 97 to allow "floating" the radix points of the integrands and the velocity increment, and the divider circuit 121 which passes only every nth motor drive pulse, with $n$ being specifiable. FIG. 6 shows a simplified diagram of the interpolator circuit of FIG. 4. The contents of the velocity increment register 95 does not change during a block of motion. The updating of the velocity integrand is no longer a simple incrementing or decrementing operation, but involves a full add operation. The sequence of operation is as follows, for each axis separately.

1. If the acceleration overflow indicator for the previous iteration is positive, the velocity increment is added to the velocity integrand, and the overflow indicator is cleared.
2. The clock pulses, in this case the add command pulses, which are generated at a specified, constant rate, sends a command pulse to both adders. Both integrands are added to their respective remainder.
3. The overflow from the velocity remainder, if any, is sent to the slide motor as a command pulse.

This mode of operation is possible only because the velocity integrand (register 83) never changes sign within a block, thus assuring that the contents of the increment register 95 may remain fixed during a block. The effect is also such that the overflow increment from the acceleration remainder register 87 may be calculated so that a straight add to the velocity integrand register 83 will always produce the desired action. The addition of the increment register 95 allows full floating radix point operation of the integrators, as will be shown below.

In the simple model the radix point is assumed at the right-hand side of all registers. If a way were available to add on more register length to the right of the radix point, while at the same time incrementing or decrementing the velocity integrand in the units place when an acceleration overflow occurs, then the fractional part of all quantities could be carried in the integrations. The velocity increment register 95 provides the required capability. It also provides the capability for shifting all integrand quantities left in their registers until the overflows come off the high end of the register, instead of an intermediate bit. That is, shifted left so that the maximum integrand magnitude would be flush left in its register. This operation is performed by the computer 51 before the data values are loaded into the respective buffer registers 45. By shifting the integrand value, all possible significance is carried in the quantities to be integrated, consistent with the available register length. This is the basis of the "full floating-point operation."

The aim of scaling is to provide a finer discrete approximation of integrated acceleration as a function of time. Since the acceleration integrand is a constant, multiplying it by a factor of, say $2^q$, where $q$ is an integer, will cause the overflow rate to go up by a factor of say $2^q$ which is desirable. However, the total number of overflows will also go up by a factor of $2^q$, causing the velocity integrand to see $2^q$ times the desired acceleration magnitude. The rate of acceleration overflow must be increased, but the effect of the overflow must be scaled down by an exactly compensating amount. Again, the velocity increment register 95 provides the means. The acceleration integrand value in register 87 is shifted flush left in the register ($2^q$ places) and the point at which incrementing takes place is shifted right by $2^q$ places in the register 95. The effect of one overflow from the acceleration addition is effectively divided by a factor of $2^q$. The net result is that the velocity integrand sees the same total acceration value influence as before, except in smaller, more evenly spaced increments, in time. Further, the left shift operation allows even more significance to be carried in the acceleration integrand.

The pulse spacing, like all parameters of a digital circuit, is discrete. Local variations of as much as fifty percent in spacing can occur whenever the output rate is an uneven multiple of the input rate, for example. The following sequence of binary operations illustrates

| No of Addition | (Overflows) | Binary Quantities |
|---|---|---|
| 1 |  | 000<br>101 |
| 2 |  | 101<br>101 |
| 3 | (1) | 010<br>101 |
| 4 |  | 111<br>101 |
| 5 | (1) | 100<br>101 |
| 6 | (1) | 001<br>101 |
| 7 |  | 110<br>101 |
| 8 | (1) | 011<br>101 |
|  | (1) | 000 |

In time, the eight evenly spaced iterations produce five unevenly spaced overflows, and the sequence repeats. The binary operation cannot be modified to eliminate such behavior. However, in the example just given, the average output pulse spacing over eight successive additions is stationary regardless of the starting condition, because the sequence repeats with a period of eight additions. The same is true for the digital integrations of any constant, except that the period varies with the particular constant.

The output divider circuit 121 accomplishes time averaging of pulse spacing by taking only every nth overflow pulse, where $n$ is specifiable. The integrator inputs must be scaled by the computer to give exactly $n$ times the desired number of pulses out, in order to compensate for the divider. This is accomplished easily by multiplying every integrand quantity by $n$. The effect is to integrate for $n$ times the desired function, then rescale the output by dividing by $n$.

Generally, the output pulse divider requires that all integration parameters (integrands, rates, etc.) be multiplied by the divider factor, $n$. Specifically, the absolute integrand values for both the X and Y axis may be determined from the basic parameter equations for parabolic motion considering the divider $n$ and the machine pulse resolution R:

$$\frac{nX}{R} = \frac{na}{R}\theta^2 + \frac{nb}{R}\theta + \frac{nX_1}{R}$$

$$\frac{nY}{R} = \frac{ne}{R}\theta^2 + \frac{ng}{R}\theta + \frac{nY_1}{R}$$

where
$\theta = t/T$
$t$ = real time
$T$ = time required for current block of tool motion
$(X_1Y_1)$ = coordinates of starting point of tool motion,
and parameters a, b, e, and g are constants for the desired motion.

Since $t$, within a block, will vary from zero to T, $\theta$ can be defined as a time parameter, where $$0 \leq \theta \leq 1$$

The above equations for motion along the axes may be rearranged for integration as follows:

$$\frac{nX}{R} = \frac{nX_1}{R} + \int_0^1 \left[\frac{nb}{R} + \int_0^1 \frac{2na}{R} d\theta\right] d\theta$$

$$\frac{nY}{R} = \frac{nY_1}{R} + \int_0^1 \left[\frac{ng}{R} + \int_0^1 \frac{2ne}{R} d\theta\right] d\theta$$

Thus, the initial integrand quantities (absolute values) may be read off directly.

$$I_{xa} = \left|\frac{2na}{R}\right| = X \text{ acceleration integrand}$$

$$I_{xv} = \left|\frac{nb}{R}\right| = X \text{ velocity integrand}$$

$$I_{ya} = \left|\frac{2ne}{R}\right| = Y \text{ acceleration integrand}$$

$$I_{yv} = \left|\frac{ng}{R}\right| = Y \text{ velocity integrand}$$

When the interpolation is complete, the X and Y velocity integrands will change to the final values as follows:

$$I_{xv} = \left|\frac{n(2a+b)}{R}\right|$$

$$I_{yv} = \left|\frac{n(2e+g)}{R}\right|$$

Knowing the above values for each data block for a part to be machined, the maximum register bit sizes may be determined. The register sizes, especially the velocity integrand registers, may be limited somewhat by proper choice of restricted travel of the tool along the part surface to fixed feedrate segments.

To obtain the register bit size, the integrand magnitudes, L, are obtained by taking the binary representation of the maximum integrand magnitude ($I_{max}$), and changing all zeros to ones:

$$L = 2^{K+1} - 1$$

where $2^K$ is the highest power of 2 in the binary representation of $I_{max}$.

Since the velocity output rate ($i$) must be directly proportional to the velocity integrand magnitude and the number of velocity remainder overflows is equal to the average velocity integrand magnitude, which is equal to the travel distance along one axis, for example, the X axis, is pulse resolution units ($\Delta X/R$), the average value of $$\bar{T}_x = \frac{L}{\frac{|\Delta X|}{R}} = \frac{M}{\frac{|\Delta X|}{R}},$$

where M is the total number of iterations or additions to obtain the prescribed travel distance. Thus, it will be seen that the total number of iterations is $$M = L = 2^{K+1} - 1.$$

Experiments with an exact computer model verified the general validity of the above equation for M, and suggested a refinement in the calculation of K, as follows:

$$K = \frac{\log(I_{max})}{\log(2)} + 0.5.$$

The computer model also showed that the ($-1$) term in the equation for M is unnecessary, leaving $$M = 2^{K+1},$$

therefore the iteration rate $R_i = M/T$.

The required register length in the present invention is also increased by the divider factor ($n$) and the acceleration scaling shift. The scaling shift causes almost a factor of two increase in register length. By selecting the proper parabolic sections along the desired tool path in which the feedrate will not change by more than a factor of 8, three additional bits should, therefore, be enough to account for velocity integrand growth over any practical block of parabolic data. The required register length, $L_g$, for the growth factor may be estimated as follows:

$$L_g = \frac{\log \left| 8 \left( 2 \frac{\Delta X}{R} \right) \right|_{max}}{\log (2)}$$

The total minimum required register length, $L_t$, can be determined as follows: small acceleration magnitudes require the largest shift right in the velocity increments register of the increment location. The minimum acceleration which will be felt at all at the output is that which causes one overflow on the velocity integrator; that is $$\left| \frac{na}{R} \right| = 1.$$

The minimum significant acceleration integral magnitude is thus $$2 \left| \frac{na}{R} \right| = 2.$$

According to the scaling scheme outlined above, this quantity must be shifted all the way left in its register. If $L_g$ is the register length in bits to account for the velocity integrand growth during the interpolation, the left shift required is ($L_g-2$) bits. The number of additional bits required by the divider factor, $n$, is $$L_n = \frac{\log (n)}{\log (2)} + 0.5.$$

Putting the three factors together:

$$L_t = L_g + L_n + (L_g-2)$$
$$= 2L_g + L_n - 2$$
$$L_t = \left( 2 \log \left| \frac{16 \Delta X}{R} \right|_{max} + \log n \right) / \log 2 - 2$$

For example, the register size $L_t$ for a maximum travel during a data block of $\Delta X = 1$ inch, a pulse resolution R of 20 microinches, and a pulse divider factor of 16, will require a register size:

$$L_t = \frac{2 \log \left| \frac{16 \times 16 \times 1}{2 \times 10^{-5}} \right|}{\log 2} - 2 = 48 \text{ bits}.$$

This value allows for any and all usable acceleration values.

One very practical restriction, on the shape of any parabolic arc to be cut, can greatly reduce register length requirements. Since $L_n$ is much less than $L_g$, it will be seen that the scaling shift term ($L_g-2$) contributes almost half the required length and is needed for the accommodation of very low acceleration contributions. If each parabolic arc can be selected in such a way as to be distinctly non-linear in shape, the acceleration integrands will be in the same range of magnitudes as the velocity integrands. The scaling shift will be very low, probably within a few bits of the radix point. The allowance for scaling shift should not be made zero, as it also covers the additional register length needed for carrying the fractional parts of the integrands. About 10 bits is a reasonable figure, as this will allow carrying three decimal places in the fractional parts.

Figure 8:
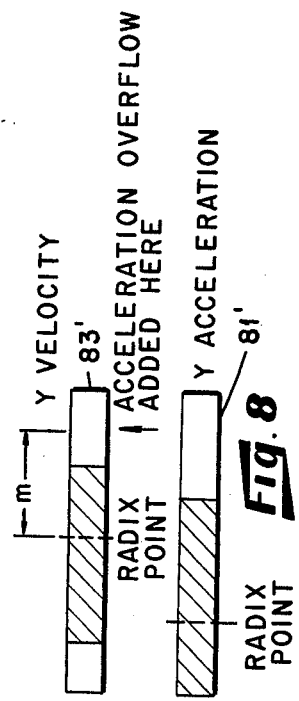
FIGS. 7 and 8 schematically depict a scaling and bit location shifting technique of the acceleration and velocity integrand values of the integrator of FIG. 4 to improve positioning accuracy.
Figure 7:
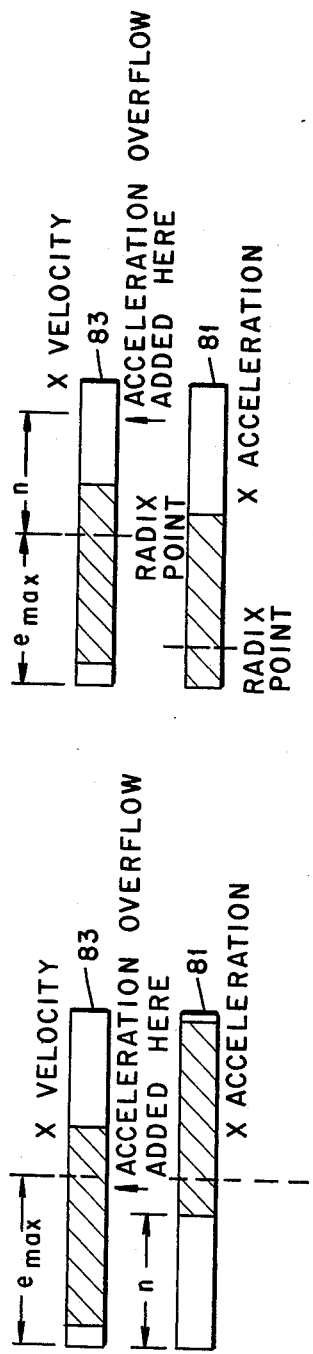

To obtain increased precision and implement the floating radix point technique mentioned above, proper shifting and scaling of the various integrand quantities must be performed by the computer 51 before the values are loaded into the respective integrand registers and the incrementing bit location of the velocity increment register 95 is set. FIG. 7 shows the typical integrand positions (shaded areas) in the registers for both axes without acceleration scaling. The registers for the X axis have been given reference numerals identical to FIG. 4 to indicate the corresponding registers, and the Y axis registers are indicated by like primed reference numerals. All radix points are aligned, as indicated by the dotted line, at a point which allows just enough open register space on the left for any growth in magnitude of the velocity integrands in registers 83 and 83'. As many significant digits ($e_{max}$) as are available past the radix point are carried, up to the register capacity. It will be seen that, with small acceleration magnitudes and large velocity magnitudes (as depicted in FIG. 7), the velocity integrators will overflow much more often than will accelerator integrators. A relatively coarse approximation of the acceleration-versus-time curve will result. For greatly improved precision, the acceleration values may be scaled by shifting all the way to the left (keep the radix point in the same location as indicated by the dotted line segments) and moving the acceleration overflow pointer (bit position at which the velocity integrand register 83 is incremented) to the right by a compensating amount, as shown in FIG. 8.

With this technique of shifting and scaling the acceleration overflows are essentially converted to fractional values which increment the velocity integrand registers at the proper fractional location to the right of the radix point for a much more exact digital integration of the acceleration value and thus greatly improved positioning accuracy along each axis of movement of the tool.

Figure 9:
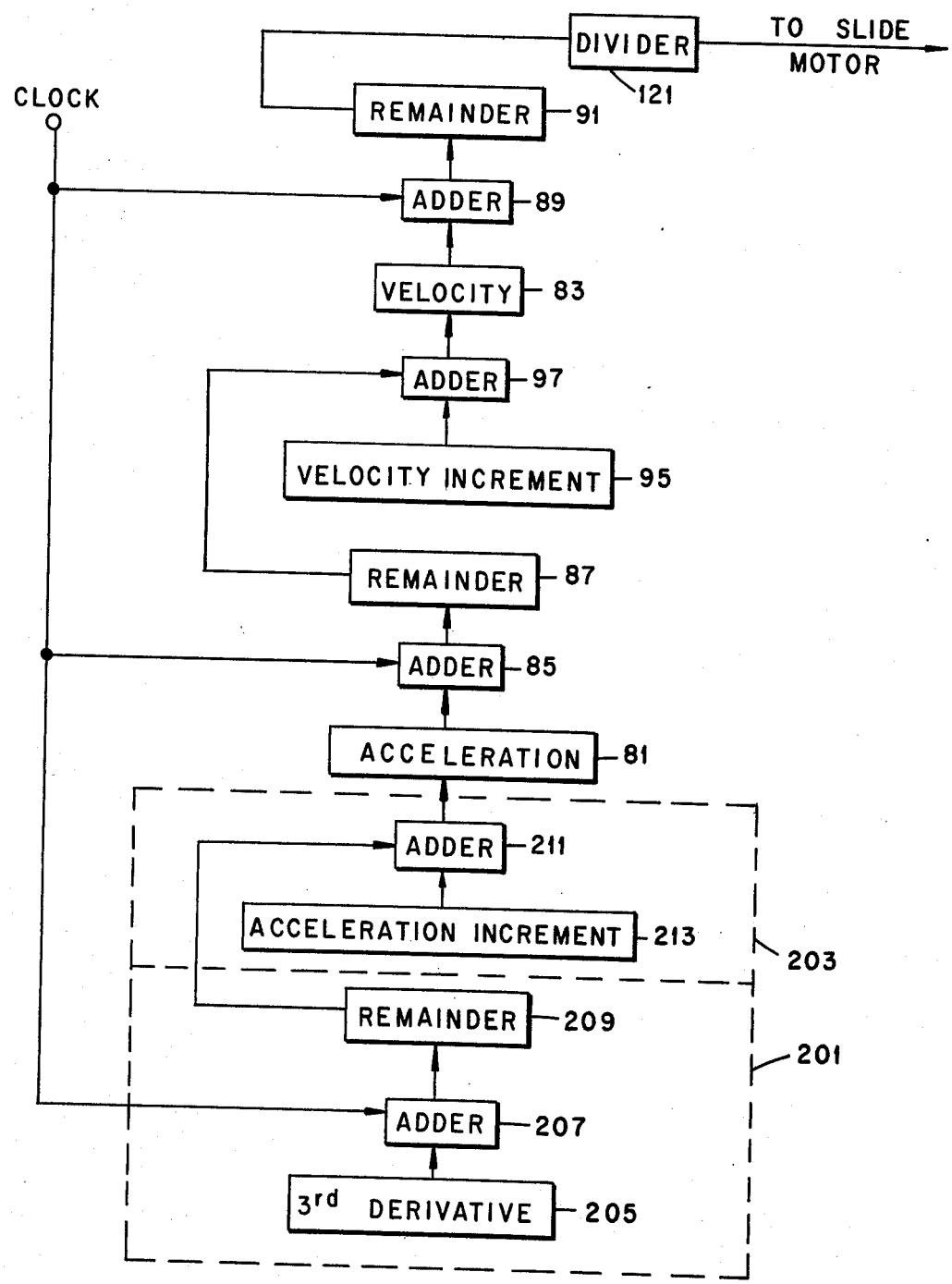
FIG. 9 is a simplified block diagram of an interpolator according to the present invention for performing cubic order interpolation to obtain position of a tool along an arc of a cubic curve.

The parabolic interpolator may be modified easily, as shown in FIG. 9, to perform cubic order interpolation to provide tool motion along an arc of a cubic order curve. Only the interpolation for one axis is shown. The interpolation structure for the other axis, or axes, is identical. Like reference numerals have been used to indicate identical registers and adders, as shown in FIG. 6, for the parabolic interpolator. One additional integrator 201 and an additional incrementing circuit 203 are all that is necessary to obtain the cubic order motion. The incrementing circuit 203 is identical in construction and function to the velocity incrementing register 95 and adder 97. A constant third derivative of motion requires three integrations to obtain position along one axis as a function of time in the form:

$$X = X_1 + At + Bt^2 + Ct^3.$$

The constant value is loaded in a third derivative integrand register 205 which is continually added to itself by means of a parallel adder 207 and the remainder temporarily stored in a remainder register 209. To obtain the same shifting and scaling technique as described above, the remainder register 209 overflows trigger and additional adder 211 which adds an acceleration increment register 213 value to the acceleration register 81 integrand value. The acceleration increment register 213 performs the same function as the velocity increment register 95, as described above. A binary 1 is loaded at the bit position of register 213 at which the acceleration value is to be incremented for each remainder register 209 overflow. The integration process continues as before to obtain the velocity remainder register 91 overflows. These overflows are divided by n in the divider 121, as described above for the parabolic interpolation process.

It will be seen that the cubic interpolator may also be used to perform parabolic or linear interpolation without switching or reconfiguration, depending solely on the integrand values which are loaded in the integrand registers. For example, if the 3rd derivative integrnd register is loaded with a zero value, parabolic interpolation may be performed by loading the acceleration and velocity registers with the proper acceleration and velocity integrand values. Further, if both the 3rd derivative and acceleration integrand values are initially zero, linear interpolation may be performed by loading the proper velocity integrand value.

Figure 10:
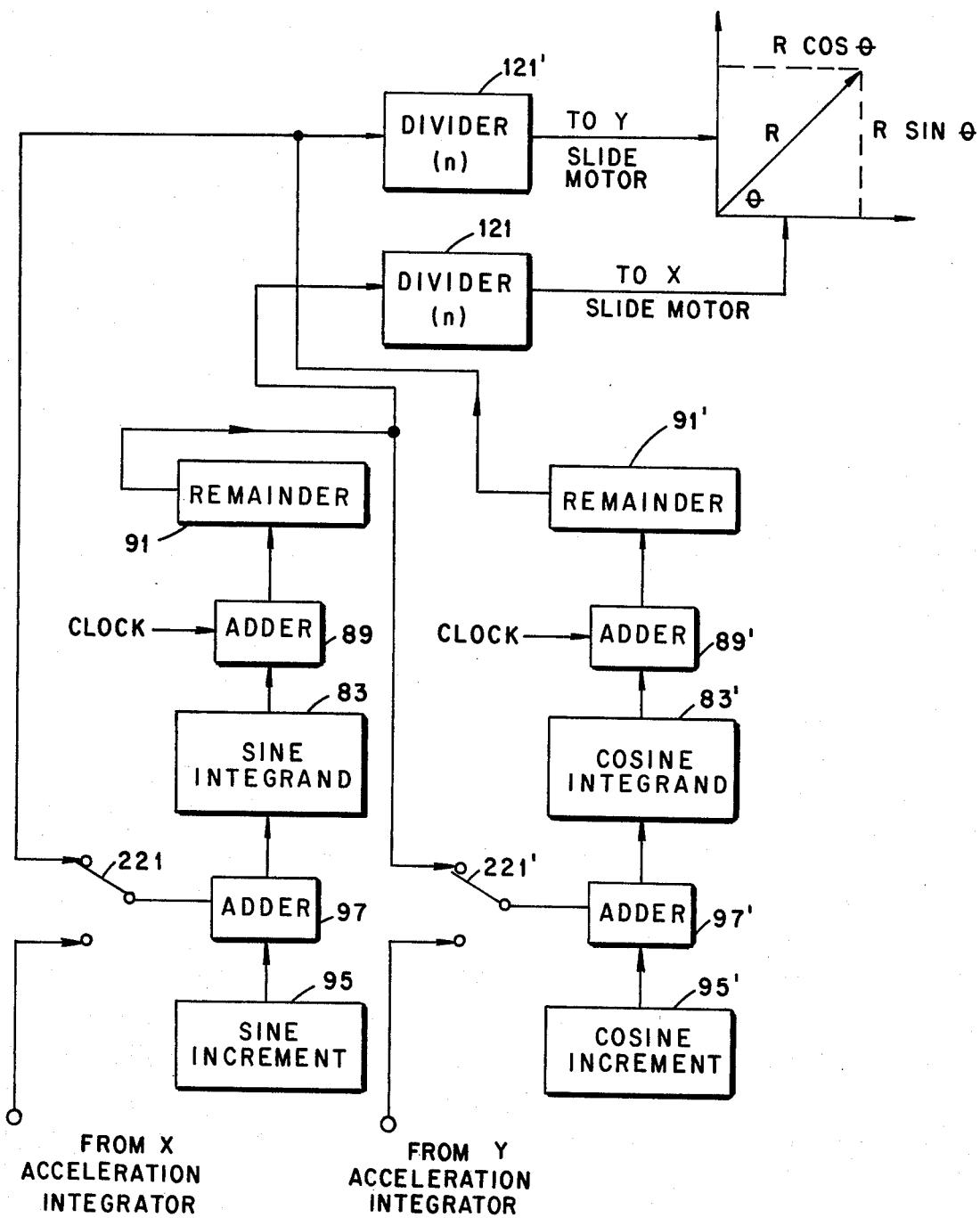
FIG. 10 is a simplified block diagram of an interpolator according to the present invention for performing circular interpolation to obtain position of a tool along a circular path.

Referring now to FIG. 10, there is shown a modification of the parabolic interpolator system of the present invention to obtain circular positioning motion on the X and Y axis positioning system. Portions of both the X and Y interpolators are shown in FIG. 10. The corresponding registers are numbered according to corresponding parts of the parabolic interpolator described above. The corresponding Y axis register and adders are indicated by like primed reference numerals. The only modification required is a two position switch 221 which has its common terminal connected to the adder 97 trigger input. The first position contact of switch 221 is connected to the acceleration remainder register overflow line. The second position contact of switch 221 is connected to the velocity remainder register 91 overflow line, that is, the second contact of switch 221 (X axis) is connected to register 91' (Y axis) and the second contact of switch 221' (Y axis) is connected to register 91 (X axis). Thus, if switches 221 and 221' are in the first position the interpolator registers may be loaded to function as a parabolic interpolator. However, when switches 221 and 221' are set to the second position, the acceleration integrator is removed from the circuit and the velocity integrator portions of the circuit are connected so that one axis velocity integrand register (83 or 83') is incremented each time the velocity integrator remainder register of the other axis interpolator overflows to produce a motor pulse.

The integrand registers 83 and 83' are loaded with binary numbers which represent the initial X and Y coordinate values of the radius vector R. If the product of R and sin $\theta$ is put in register 83 and the product of R and cos $\theta$ is put into register 83', where R is the radius of the desired arc and $\theta$ is the angle between the X axis and the radius vector, then any point on the arc to be traveled is defined by the values X = R sin $\theta$ and Y = R cos $\theta$, i.e., $$X = R \int \cos \theta \, d\theta = R \sin \theta$$

$$Y = R \int \sin \theta \, d\theta = -R \cos \theta.$$

Thus if the two integrators integrate the quantities R sin $\theta$ and R cos $\theta$ continuously, the coordinates X and Y will define a circular arc if the overflows of each integrator are fed to the other. For example, each time an overflow occurs from the integrator for the X axis (sine integrator) the integrand value of the Y axis (cosine integrator) is incremented in the units position by placing a binary one in the proper bit position of the cosine increment register 95'. Thus the sine and cosine integrand values, which have been modified to compensate for the output pulse dividers 121 and 121', are incremented at the units bit position by means of the increment adders 97 and 97', respectively, as described above with reference to FIG. 4.

Thus, it will be seen that a very versatile and precise system is provided to perform linear and non-linear interpolation from binary data values to provide either parabolic, cubic, or circular motion of a machine tool or other positioning servo mechanisms in which the member to be positioned is moved along the prescribed path by separate coordinate axes positioning.

What is claimed is:

1. In combination with a positioning system for automatic positioning of at least one positionable member driven by a drive means along an axis at a rate responsive to the rate of command pulses applied to said drive means and including a computer having a data storage means for storing descriptive data in the form of a plurality of data blocks of binary values each relating to a particular motion to be achieved by said positionable member within a prescribed time frame, an interpolator for accepting said descriptive data one block at a time and generating said command pulses sepecified by a data block within the prescribed time frame, comprising:

a first digital integrator means for receiving and storing a first binary integrand value from said computer of the particular one of said data blocks being executed and producing a first train of pulses according to the integral of said first binary integrand value with respect to said prescribed time frame;

a second digital integrator means for receiving a second binary integrand value from said computer of said particular data block being executed and producing a second train of pulses according to the integral of said second binary integrand value with respect to said prescribed time frame, each of said integrators includes an integrand register having a predetermined fixed bit size and operative to store the corresponding binary integrand value, a parallel bit digital adder having first and second add inputs, a sum output, which is the sum of binary values applied to said first and second add inputs and an overflow output, said first add input connected to receive said integrand value stored in said integrand register, and a remainder storage register of a bit size identical to said integrand register and having an output connected to said second add input of said adder and an input connected to said sum output of said adder, said remainder storage register having a transfer trigger input connected to receive said control pulses from said control means, so that upon receiving a control pulse the remainder value stored in said remainder storage register is added to said integrand value and the sum is reloaded into said remainder storage register;

means responsive to said first train of pulses for incrementing said second integrator integrand at a selected bit position so as to continually change the integrand value of said second integrator with respect to said prescribed time frame according to the integral value of said first integrator;

control means for accepting a binary time value from said computer, the magnitude of which controls the rate of generation of said first and second train of pulses within said time frame for the particular data block being executed and generates control pulses to said first and second integrators to effect integration of said integrand values according to said time frame;

output circuit means for applying said second train of pulses to the corresponding axis drive means; and an end-of-block interrupt signal generating means for sensing the pulses to said axis drive means and generating an end-of-block interrupt signal to said computer when a specified number of command pulses for the block being executed is applied to said axis drive means.

2. The combination as set forth in claim 1 wherein said control means includes a time value storage register connected to receive and store said binary time frame control value for the particular data block being executed, a presettable binary counter having a predetermined maximum count level at which an overflow pulse is generated at an overflow output thereof, said presettable counter being connected to said time value storage register and repeatedly preset to said binary time frame control value stored in said time value storage register each time said presettable counter overflows, a fixed period clock pulse source connected to a count input of said presettable counter for controlling the count rate of said counter, a control pulse generator means for generating a sequence of control pulses at separate outputs, and logic circuit means responsive to said sequence of control pulses for applying said control pulses to the transfer trigger inputs of the remainder storage registers of said first and second integrators to provide the integral output pulse trains according to the integrand value integrals with respect to the data block time frame specified by said binary time frame control value stored in said time value storage register.

3. The combination as set forth in claim 2 wherein said interpolator is a parabolic interpolator and wherein said first integrand value stored in said first integrator integrand register is an acceleration integrand value and wherein said second integrand value stored in said second integrator integrand register is a velocity integrand value so that the positioning of said positionable member during execution of a data block is along a parabolic path.

4. The combination as set forth in claim 3 wherein said means for incrementing said second integrator integrand value includes a velocity increment storage register having a bit size identical to that of said second integrator integrand register in which said velocity value is stored, a parallel bit increment adder having first and second add inputs and a sum output, said first input of said increment adder connected to receive the value stored in said increment storage register and said second input of said increment adder connected to receive the velocity integrand value stored in said second integrator integrand register, and wherein said logic circuit means includes a gating circuit responsive to a selected one of said sequence of control pulse for transferring the velocity integrand value stored in said second integrator integrand register to said increment adder and the subsequent increment adder sum is reloaded into said second integrator integrand register in response to each overflow pulse from said first integrator adder.

5. The combination as set forth in claim 4 wherein said output circuit means includes a divider circuit means connected in series with the output of said second integrator so that the axis drive means command pulses are divided by a factor $n$ where $n$ is a factor by which the acceleration and velocity integrand quantities and said time value has been scaled to provide exactly n times the desired number of pulses from said second integrator to smooth the axis drive means command pulse spacing with respect to time.

6. The combination as set forth in claim 2 wherein said interpolator is a cubic interpolator and wherein said first integrand value stored in said first integrand register is an acceleration integrand value, wherein said second integrand value stored in said second integrator integrand register is a velocity integrand value, and further including a third digital integrator means identical to said first and second integrator means for receiving a third binary integrand value from said computer according to the third derivative of the motion along said axis for a particular data block being exectued and producing a third train of pulses according to the integral of said third binary integrand value with respect to said prescribed time frame, and means responsive to said third train of pulses for incrementing said first integrator integrand at a selected bit position so as to continually change the integrand value of said first integrator with respect to said prescribed time frame according to the integral value of said third integrator so that the positioning of said positionable member during execution of a data block is along a cubic path.

* * * * *